2,964,341
Patented Dec. 13, 1960

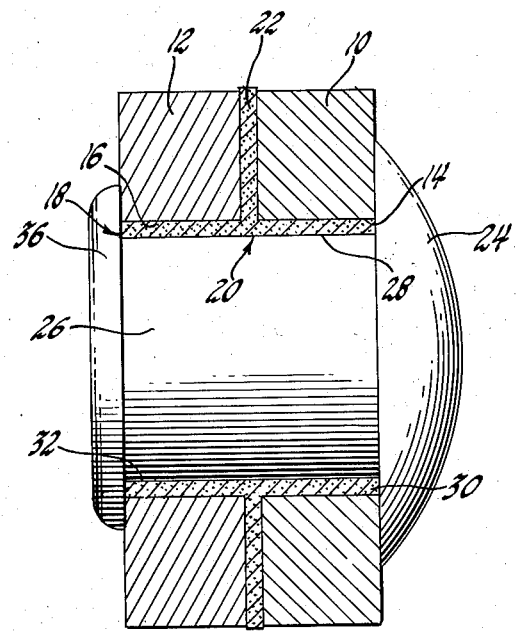
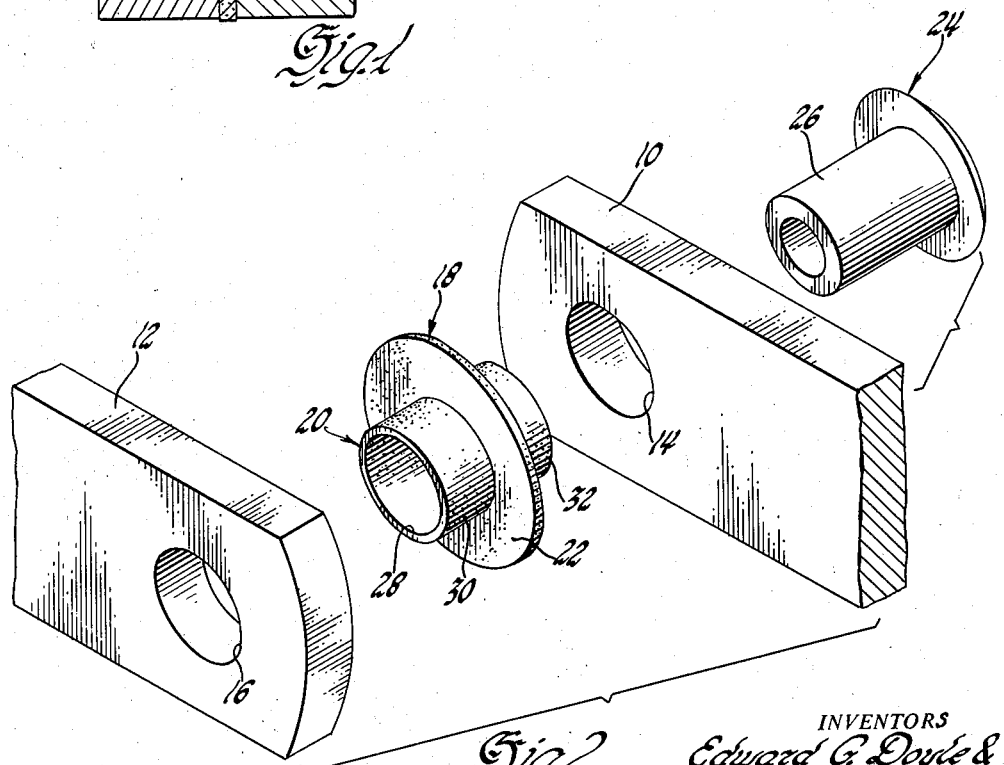

2,964,341
PIVOTAL JOINT

Edward G. Doyle, Grosse Pointe Woods, and Herman A. Klix, Royal Oak, Mich., assignors to General Motors Corporation, Detroit, Mich., a corporation of Delaware Filed Dec. 30, 1957, Ser. No. 705,892

1 Claim. (Cl. 287—101)

This invention relates generally to pivotal joints and more particularly to an improved pivotal joint.

One of the most important problems encountered in pivotal joints is that of play between the parts of the joint. For example, in a pivotal joint between a pair of links and including a hinge pin, it is desirable that the links be secured against both lateral and longitudinal shifting movement relative to the hinge pin and each other and that the links also be secured against tilting movement relative to the hinge pin. The problem of shifting and tilting movement of the links is especially apparent in metal joints due to both manufacturing tolerances and wear of the joint during service. By providing an accurately machined hinge pin and also accurately machined openings in the links and by tightly holding the links against each other, the problem of shifting and tilting movement can be controlled to some extent. However, the cost of accurately machining the hinge pin and the openings in the links often makes such a solution prohibitive. Additionally it is desirable that the links be able to freely and easily rotate relative to each other, which cannot be done if the links are held tightly against each other.

This invention is directed to the problem of solving play in pivotal joints and provides an improved pivotal joint which is free of play under all service conditions and yet does not require any accurately machined parts. Thus, parts manufactured within normal manufacturing tolerances can be used and yet the joint works easily under all service conditions for long periods of time without play or any wear of the parts of the joint.

In the preferred embodiment of this invention, the problem of play is solved by the use of a deformable bushing member of nylon. Nylon is a generic term for a polyamine which generally is a polymer of a hexamethylene diamine and a dicarboxylic acid, the most commonly used of which is a polymer of hexamethylene diamine and adipic acid. Nylon has an inherent lubricating property and also a high tensile strength and a moderate impact strength. These properties of nylon are very useful in the pivotal joint of this invention. The bushing member generally includes a tubular bushing having an intermediate annular flange. The bushing receives the hinge pin and is itself received within openings in the links, with the flange of the bushing member being located between and in face to face contact with the inner faces of the links. At least one end of the bushing extends slightly beyond the outer face of one link, although both ends of the bushing may extend beyond the outer faces of both the links if so desired. The hinge pin is preferably headed at one end thereof, as a rivet for example. After the joint is assembled, the other end of the rivet is thereafter headed over. When the other end of the rivet is headed over, the links are moved slightly toward each other and the bushing is compressed axially whereby the nylon material of the bushing will flow in both axial and radial directions to completely fill the annular space between the surface of the openings in the links and the outer surface of the hinge pin. Additionally the flange of the bushing member is also compressed axially as the links are moved slightly toward each other so that it will flow radially outwardly between the links. Since the nylon bushing is deformed to completely fill the annular space between the openings in the links and the hinge pin, it is extremely difficult, if not impossible, for the links to shift either longitudinally or laterally relative to each other and the hinge pin. Additionally, since the links are held tightly against the now deformed nylon flange of the bushing member, it is also extremely difficult, if not impossible, for the links to tilt relative to the hinge pin. Thus, the links are generally held against all movement except rotational movement relative to each other about the hinge pin. Since the nylon bushing member has inherent lubricating properties, as previously mentioned, the links will move freely and easily relative to each other about the hinge pin despite the fact that the links are held tightly against the flange of the bushing member and any space between the openings of the link and the outer surface of the hinge pin is completely filled.

An object of this invention is to provide a new and improved pivotal joint. Another object of this invention is to provide a new and improved pivotal joint between relatively rotatable members which is free of all play. A further object of this invention is to provide a new and improved pivotal joint between relatively rotatable members which includes a nylon bushing member deformed during assembly of the joint.

These and other objects of this invention will be readily apparent from the following specification and drawings wherein:

Figure 1 is an enlarged axial sectional view of an assembled pivotal joint according to this invention; and Figure 2 is a perspective exploded view of the parts of a pivotal joint according to this invention.

Referring now to Figure 2 of the drawings, a pair of links 10 and 12 are each provided with an opening 14 and 16 respectively, adjacent one end thereof. The links 10 and 12 are manufactured within normal manufacturing tolerances whereby the openings 14 and 16 are not machined or otherwise finished in any manner to a higher degree of tolerance. In the specific example shown, the links are .187 inch thick and the openings 14 and 16 are $$.425 + .004$$
$$-.000$$

inch in diameter. A bushing member 18 of nylon is provided with a tubular bushing portion 20 and an annular flange 22 intermediate the ends of the bushing portion 20 and integral therewith. It is intended that the bushing member 18 be formed in any suitable manner, such as by molding and also that the bushing member 18 be manufactured under normal manufacturing tolerances. In the specific example shown, the O.D. of portion 20 is $$.425 + .000$$
$$-.001$$

inch, the I.D. is $$.375 + .000$$
$$-.001$$

inch, and the length is .429±.002 inch, the O.D. of flange 22 is .924 and the thickness is .025. A headed metal rivet 24 is also provided to hold the links 10 and 12 together and in engagement with the nylon bushing 18 as will be described to provide an assembled pivotal joint. The O.D. of the shank 26 of the rivet is $$.375 + .000$$
$$-.003$$

inch, the length .481±.002 inch; the O.D. of the head of the rivet is .656 and the thickness at the axis of the rivet is .130.

Referring now to Figure 1 of the drawings, when the parts are assembled, the shank 26 of the rivet 24 is received within the bore 28 of the nylon bushing member 18, with the one tubular end portion 30 of the bushing being received within the opening 14 of link 10 between the surface of the opening and the outer surface of the shank 26 of the rivet 24 and with the other tubular end portion 32 of the bushing being received within the opening 16 of link 12 between the surface of the opening and the outer surface of the shank 26 of the rivet 24. The flange 22 of the bushing is received between the links 10 and 12 in face to face contact with the inner surfaces of each of the links, that is the surfaces of the links which face each other. Although not shown in the drawings, when the parts are initially assembled, each end of the tubular portion 20 of bushing 18 extends .025±.001 inch beyond the outer surfaces of the links 10 and 12 so that the inner surface of the head or rivet 24 does not engage the outer surface of link 10. Thereafter, the end of the shank 26 of rivet 24 is headed over at 36, the links 10 and 12 are moved slightly toward each other, .0025 to .005 inch and the tubular portion 20 of the bushing member 18 is compressed axially so that the nylon material of the bushing completely fills any and all space between the surfaces of the openings 14 and 16 and the outer surface of the shank 26 of the rivet 24. The pressure usually applied to the ends of the rivet is from 25,000 to 50,000 p.s.i. in order to head over the one end of the rivet at 36, as shown. Since the head of the rivet closes one end of the annular space between the openings in the links and the shank 26 of the rivet, while the headed over end of the rivet closes the other end of the annular space, the nylon must remain within this annular space and completely fill the annular space regardless of whether the annular space has the same thickness from one end thereof to the other end thereof. There will be very little radial flow of the nylon material of the bushing portion 20 of the bushing member outwardly between the inner faces of the links since this material must move at right angles in order to flow radially outwardly. However, there will be some slight radial flow of the nylon material of the bushing portion 20 which is coextensive with the nylon material of the flange 22 so that the flange 22 will be moved slightly radially outwardly by the axial compression of the tubular portion 20 of the bushing member.

Additionally, when the one end of the rivet is headed over at 36, the flange 22 of the bushing is also compressed axially as the links 10 and 12 move slightly toward each other and therefore will flow radially outwardly within the space between the inner surfaces of the links. The reduction in thickness of the flange is from .005 to .010 inch, and although the flange is usually still circular after being compressed axially, it may be otherwise, such as having a ragged edge.

Since the nylon material fills all the space between the surfaces of the openings in the links and the outer surface of the shank 26 of the rivet, and additionally is under compression, the links are effectively prevented from shifting either longitudinally or laterally relative to the shank 26 of the rivet. Additionally, since the links are also tightly held between the ends of the rivet and the compressed nylon material of the flange 22 of the bushing, the links are also effectively held against any tilting movement relative to each other and the rivet 24. Thus, although the links can rotate freely and easily about the rivet, they cannot shift bodily relative thereto or tilt relative thereto. Thus, an improved pivotal joint is provided which is substantially free of any play.

While a rivet 24 is shown in the drawings, it will be understood that a bolt could also be used, with a nut being threaded on the threaded end of the bolt and engaging the outer surface of the link 12 to thereby compress the tubular portion 20 of the bushing member and also the flange 22 thereof as has been previously explained. Also if desired, a threaded stud could be used, with nuts being threaded on either end thereof to engage the outer surfaces of the links 10 and 12. Therefore, although a headed rivet 24 has been shown and described, it will be understood that other connecting members can be used with equal success.

Additionally it should be noted that in certain installations either the tubular end portion 30 or 32 of the bushing member may not be necessary whereby the surface of the opening 14 or 16 will fit directly against the shank 26 of the rivet. Also, the flange 22 may not be necessary in certain installations whereby the links 10 and 12 will engage each other.

From the preceding description, it will be understood that the deforming of the nylon material of the bushing member to fill any and all space between the relatively movable members is an important feature of this invention since the material when deformed, provides a smooth bearing surface and has an inherent lubricating property. Additionally, nylon has a moderate impact strength and when once deformed, substantially retains its deformed shape.

Thus this invention provides a new and improved pivotal joint which is free from any play so that the joint has a long and useful life under substantially all service conditions without failure of the joint and without any bodily shifting movement or tilting movement of the rotatable members relative ot each other and the hinge pin of the joint.

We claim:

A pivotal joint comprising a pair of laterally spaced apertured members, a connecting member fitting within the apertures of said members and spaced from the surfaces thereof to provide an annular space therebetween, said connecting member including a head portion at one end thereof in surface bearing engagement with the outer surface of one of said apertured members to close one end of said annular space, a nylon bushing member including a bushing portion received on said connecting member within said annular space and a washer portion fitting between said laterally spaced members in surface to surface engagement therewith, said bushing portion having an initial wall thickness smaller than the radial extent of said annular space and an initial axial extent greater than the axial extent of said annular space so as to project outwardly beyond the outer surface of the other of said apertured members, and means providing a head on the other end of said connecting member in surface bearing engagement with said outer surface of the other of said apertured members to move said apertured members toward each other and assemble said joint, said bushing portion being compressed axially during assembly of said joint so as to be deformed both axially and radially to conform to the shape of said annular space and said washer portion being compressed laterally to a reduced thickness when said members are moved toward each other during assembly of said joint so as to flow radially outwardly between said apertured members, said bushing portion providing a self-lubricating bearing on said connecting member for said apertured members and said washer portion providing a self-lubricating bearing between said apertured members.

References Cited in the file of this patent

UNITED STATES PATENTS

| Number | Name | Date |
|---|---|---|
| 771,236 | Farley | Oct. 4, 1904 |
| 2,499,315 | Johnson | Feb. 28, 1950 |
| 2,571,560 | Gall | Oct. 16, 1951 |
| 2,745,130 | Aishei | May 15, 1956 |
| 2,816,453 | Frank et al. | Dec. 17, 1957 |
| 2,828,668 | DeAngelis | Apr. 1, 1958 |

FOREIGN PATENTS

| 1,098,989 | France | Aug. 29, 1955 |
| 1,122,424 | France | Sept. 6, 1956 |